United States Patent
Rewerts et al.

(10) Patent No.: US 7,233,455 B1
(45) Date of Patent: Jun. 19, 2007

(54) METHOD AND APPARATUS FOR PROVIDING A TEMPORARY UTILITY ZONE IN A DISK DRIVE

(75) Inventors: David Rewerts, Longmont, CO (US); Bruce Liikanen, Berthoud, CO (US); John VanLaanen, Louisville, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 10/859,058

(22) Filed: Jun. 2, 2004

Related U.S. Application Data

(60) Provisional application No. 60/475,097, filed on Jun. 2, 2003.

(51) Int. Cl.
 G11B 21/02 (2006.01)
 G11B 5/09 (2006.01)

(52) U.S. Cl. .......................................... 360/75; 360/48

(58) Field of Classification Search ............... None
See application file for complete search history.

(56) References Cited

U.S. PATENT DOCUMENTS

| 6,198,709 B1 * | 3/2001 | Shirane | 369/59.22 |
| 6,519,107 B1 * | 2/2003 | Ehrlich et al. | 360/75 |
| 2002/0136118 A1 * | 9/2002 | Takahashi | 369/47.14 |

* cited by examiner

*Primary Examiner*—Andrew L. Sniezek
(74) *Attorney, Agent, or Firm*—Fellers, Snider, et al.

(57) ABSTRACT

A disk surface has a keep-out region and a certified region. A transducer associated with the disk surface writes servo information in the keep-out region under control of a servo track writer. The transducer then writes data in a temporary utility zone in the keep-out region. Next, a self-servo write operation uses data in the temporary utility zone to write servo information in the certified region. Thereafter, data is transferred from the temporary utility zone to a final utility zone in the certified region.

90 Claims, 7 Drawing Sheets

RELEVANT ART

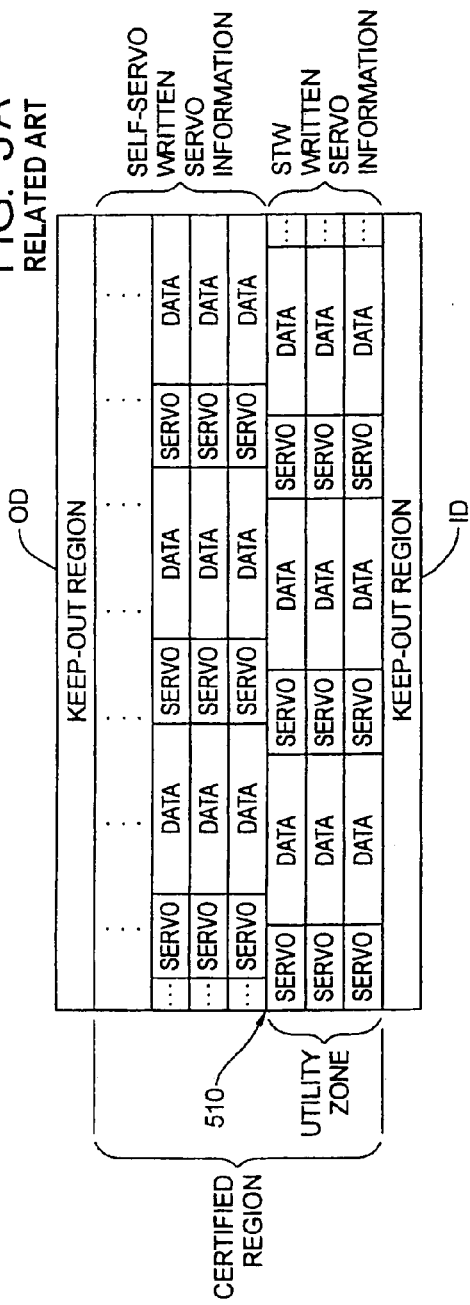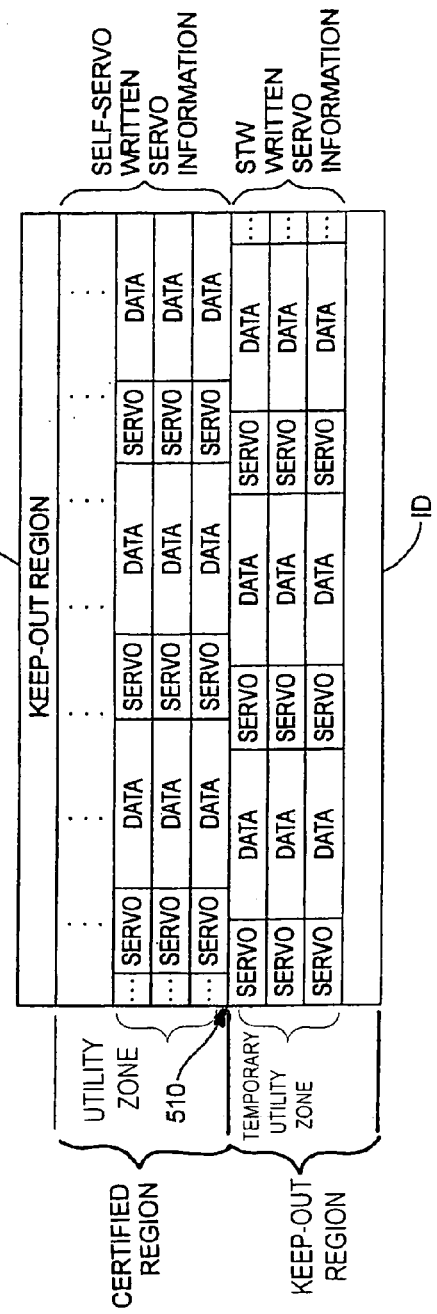

METHOD AND APPARATUS FOR PROVIDING A TEMPORARY UTILITY ZONE IN A DISK DRIVE

CROSS-REFERENCE TO RELATED APPLICATIONS

This application claims priority from U.S. Provisional Application Ser. No. 60/475,097 filed Jun. 2, 2003, which is incorporated herein by reference in its entirety.

FIELD OF THE INVENTION

The embodiments of the present invention relate generally to data storage devices, and more particularly to providing a temporary utility zone in a disk drive.

BACKGROUND OF THE INVENTION

Disk drives store information on magnetic disks. Typically, the information is stored in concentric tracks on the disk and the tracks are divided into servo sectors that store servo information and data sectors that store customer data. A transducer (head) reads from and writes to the disk. The transducer is mounted on an actuator arm that moves the transducer radially over the disk. Accordingly, the actuator arm allows the transducer to access different tracks on the disk. The disk is rotated by a spindle motor at high speed which allows the transducer to access different data sectors on the disk.

FIG. 1 illustrates a conventional disk drive 10 that includes a magnetic storage disk 12 that is rotated by a spindle motor 14. The spindle motor 14 is mounted on a base plate 16. An actuator arm assembly 18 is also mounted on the base plate 16.

The actuator arm assembly 18 includes a transducer 20 mounted on a flexure arm 22 which is attached to an actuator arm 24 that rotates about a bearing assembly 26. The actuator arm assembly 18 also contains a voice coil motor (VCM) 28 which moves the transducer 20 relative to the disk 12. The spindle motor 14, the transducer 20 and the voice coil motor 28 are coupled to electronic circuits 30 mounted on a printed circuit board 32. The electronic circuits 30 include a read/write channel, a microprocessor-based controller and a random access memory (RAM).

The disk drive 10 typically includes multiple disks 12 and therefore multiple actuator arm assemblies 18. However, the disk drive 10 can include a single disk 12.

FIG. 2 illustrates the disk drive 10 coupled to a host computer 33 by an input/output port 34. The disk drive 10 includes a controller 36, a read/write channel 38 and interface 40. The host computer 33 uses the disk drive 10 as a data storage device. The host computer 33 delivers data access requests to the disk drive 10 via the port 34. In addition, the port 34 transfers customer data between the disk drive 10 and the host computer 33 during read and write operations.

Data is stored on the disk 12 as magnetic polarity transitions in substantially concentric tracks on its surface. Data is read from the disk 12 by positioning the transducer 20 above a desired track and sensing the magnetic polarity transitions stored within the track as the track moves below the transducer 20. Similarly, data is written to the disk 12 by positioning the transducer 20 above a desired track and delivering a write current representative of the desired data to the transducer 20.

The VCM 28 positions the transducer 20 relative to the disk 12 in response to a control signal ($i_{control}$) generated by the controller 36. The controller 36 generates the control signal in response to an access command received from the host computer 33 via the interface 40 or in response to servo information read from the disk 12.

The channel 38 processes data that is read from or written to the disk 12. During a read operation, the channel 38 converts an analog read signal generated by the transducer 20 into digital data for the controller 36. The channel 38 also recovers timing information from the analog read signal. During a write operation, the channel 38 converts customer data received from the host computer 33 into a write current that is delivered to the transducer 20 to write the customer data to the disk 12. The channel 38 also continually processes servo information read from the disk 12 and delivers the processed servo information to the controller 36 for positioning the transducer 20.

FIG. 3 is a top view of the disk 12 illustrating a typical organization of data. The disk 12 includes concentric data storage tracks 42 for storing data. The tracks 42 are illustrated as centerlines, however the tracks 42 each occupy a finite width about a corresponding centerline. Disk 12 also includes radially-aligned servo spokes (or wedges) 44 that cross the tracks 42 and store servo information in servo sectors in the tracks. The servo information is read by the transducer 20 during read and write operations to position the transducer 20 above the desired track 42. More specifically, the servo information includes servo bursts (A, B, C and D servo bursts or the like) to generate a position error signal (PES) to position the transducer 20 relative to a track centerline during a track following operation. The disk 12 also includes customer data regions 46 between the servo spokes 44 that cross the tracks 42 and store customer data in data sectors in the tracks 42. The customer data is received from the host computer 33.

Although a small number of the tracks 42, the servo spokes 44 and the customer data regions 46 are shown for ease of illustration, the actual number of the tracks 42, the servo spokes 44 and the customer data regions 46 is considerably larger.

The disk 12 also includes a keep-out region 302 near disk's inner diameter (ID) and a keep-out region 304 near the disk's outer diameter (OD). The keep-out regions 302 and 304 are reserved for disk slip of the disk 12 based on built-in tolerance for expected disk slip. That is, no customer data is stored in the customer data regions 46 in the keep-out regions 302 and 304 because if disk slip occurs, for example due to the disk drive 10 being bumped during shipping, handling or use, the disk drive manufacturer cannot guarantee that the customer data stored in the keep-out regions 302 and 304 will be accessible. The keep-out regions 302 and 304 have sizes based on expected disk slip, and are shown with exaggerated sizes for illustrative purposes.

The disk 12 also includes a certified region 306 between the keep-out regions 302 and 304. The certified region 306 is immune to disk slip. That is, customer data is stored in the customer data regions 46 in the certified region 306 because if disk slip occurs, the disk drive manufacturer guarantees that the customer data stored in the certified region 306 will be accessible in the absence of catastrophic failure, media defects and the like. In contrast, the keep-out regions 302 and 304 are uncertified regions on the disk 12.

The disk 12 also includes a utility zone 310 located in the certified region 306. The utility zone 310 stores data for the proper operation of the disk drive 10. For example, the utility zone 310 can include a log of bad data sectors on the disk 12, diagnostic information, read channel tables, test scripts, test results, error counters, performance metrics, micro-jog tables, servo optimization tables, drive code, test code and debug information. The utility zone 310 is shown as a single track located near the ID of the disk 12. However, the utility zone 310 can include multiple tracks and can be located near the OD of the disk 12 or at any other location in the certified region 306.

During disk drive manufacturing, a servo track writer (STW) positions the transducer at radial positions over the disk so that the transducer writes the servo information on the disk with high positional accuracy. The STW is an expensive piece of capital equipment, and even a small reduction in the servo information needed to be written by the STW can result in significant time and cost savings. Furthermore, as the tracks per inch (TPI) increases, the servo write time increases since the STW makes more circumferential passes over the disk, thereby increasing the demands on the STW. Thus, unless more STWs are supplied, manufacturing times will continually increase as the TPI increases.

Disk drives have been designed to perform self-servo writing in an effort to reduce STW usage. During self-servo writing, the disk drive uses temporary servo information stored on the disk and self-servo-writing instructions stored in the utility zone to write the final servo information on the disk. Unfortunately, a discontinuity may occur in the certified region between the final servo information and the utility zone.

FIG. 4 is a flowchart 400 illustrating self-servo writing that causes a discontinuity between the final servo information and the utility zone.

The disk drive is placed in a first station that includes a STW (step 410). The STW is used to write a small band of final embedded servo information in a circumferential fashion in the certified region of the disk. The STW is also used to write temporary spiral servo information across the remainder of the certified region. More specifically, instead of using the STW to write embedded servo information in a circumferential fashion at each radius in the certified region, the STW is used to write temporary servo information in a spiral fashion by moving the transducer in a controlled manner (at a constant velocity or along a velocity profile) from the edge of the band of the embedded servo information to the edge of the certified region as the disk spins. By writing the temporary servo information in a spiral fashion, the servo write time for the remainder of the certified region is a function of the number of spirals rather than the number of tracks. However, the STW is not used to write servo information in the keep-out region.

Next, the disk drive is moved to a second station, so as to free-up the STW at the first station for other disk drives (step 420). At the second station, which includes a host connection to the disk drive, self-servo writing instructions are loaded (written) into a utility zone that is within the small band of embedded servo information in the certified region. Diagnostic information and self-test code may also be loaded into the utility zone.

Next, the disk drive is moved to a third station (step 430). The disk drive is powered-on, reads the self-servo writing instructions in the utility zone, and converts the spiral servo information into embedded servo information without further assistance from the STW. More specifically, the disk drive positions the transducer by servoing on the spiral servo information to self-servo write embedded servo information in the remainder of the certified region using the self-servo writing instructions. However, the self-servo writing does not write servo information in the keep-out region. FIG. 5A illustrates a discontinuity 510 between the embedded servo information in the utility zone written using the STW and the embedded servo information in the certified region adjacent to the utility zone written by the self-servo writing. The discontinuity 510 extends substantially about a radius of the disk surface. The discontinuity 510 reflects that the embedded servo information in the utility zone is radially incoherent with the embedded servo information outside the utility zone. The discontinuity 510 arises (or is likely to exist) since the embedded servo information in the utility zone is written at a significantly earlier time than the embedded servo information outside the utility zone. Thus, the discontinuity 510 may be due to changes in environmental conditions between the two servo writing operations. For example, thermal changes may occur between the two servo writing operations. In addition, handling the disk drive (such as moving it from station-to-station) may cause alignment changes (such as spindle tilt).

Because the utility zone is accessed during normal operation of the disk drive, the transducer must cross over the discontinuity during seek operations that move the transducer into or out of the utility zone. As a result, special drive code is required to accommodate the discontinuity. Furthermore, accessing the special drive code may delay the seek operations, thereby degrading the performance of the disk drive.

Accordingly, there is a need for self-servo writing without creating a discontinuity between the final servo information and the utility zone.

SUMMARY OF THE INVENTION

The embodiments of the present invention meet the aforementioned and other needs.

In an embodiment, a disk surface has a keep-out region and a certified region. A transducer associated with the disk surface writes servo information in the keep-out region under the control of a STW. The transducer then writes data in a temporary utility zone in the keep-out region. Next, a self-servo write operation uses data in the temporary utility zone to write servo information in the certified region. Thereafter, data is transferred from the temporary utility zone to a final utility zone in the certified region.

The data used by the self-servo write operation can include self-servo writing instructions, and the data transferred to the final utility zone can include bad sector data.

Advantageously, a discontinuity between the servo information written using the STW and the servo information written by self-servo writing need not be crossed during normal operation of the disk drive.

Other embodiments, objects, features and advantages of the invention will be apparent from the following description taken in conjunction with the following drawings.

BRIEF DESCRIPTION OF THE DRAWINGS

FIG. 5A is a diagrammatic representation of a discontinuity between the final servo information and the utility zone;

FIG. 5B is a diagrammatic representation similar to FIG. 5A but having no discontinuity between the final servo information and the utility zone in accordance with embodiments of the present invention.

DETAILED DESCRIPTION OF THE PREFERRED EMBODIMENTS

Figure 1:
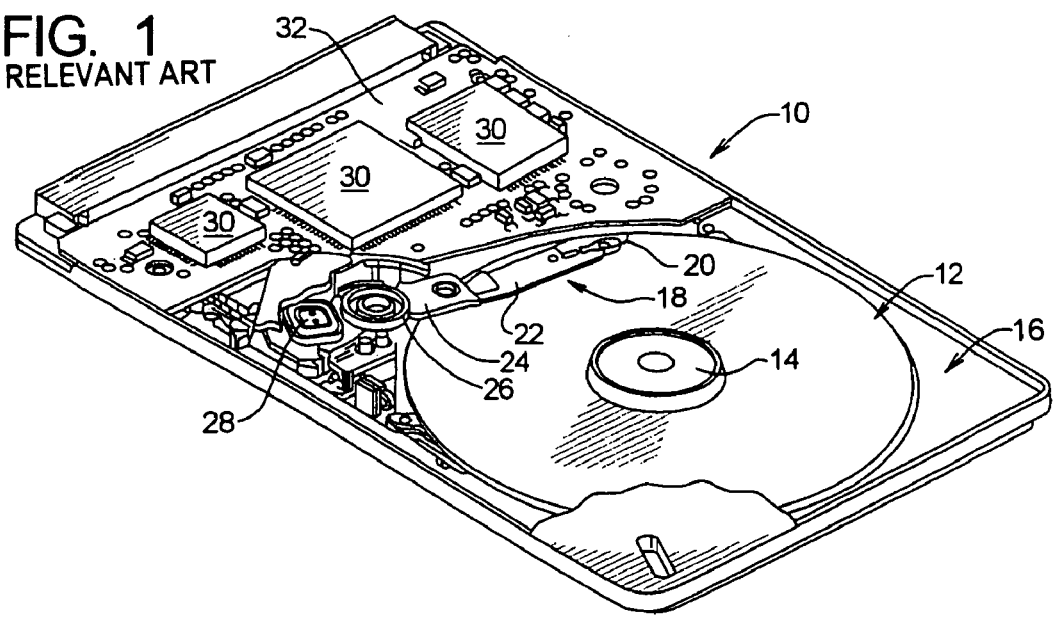
FIG. 1 is a diagrammatic representation of a conventional disk drive with its top cover removed.
Figure 2:
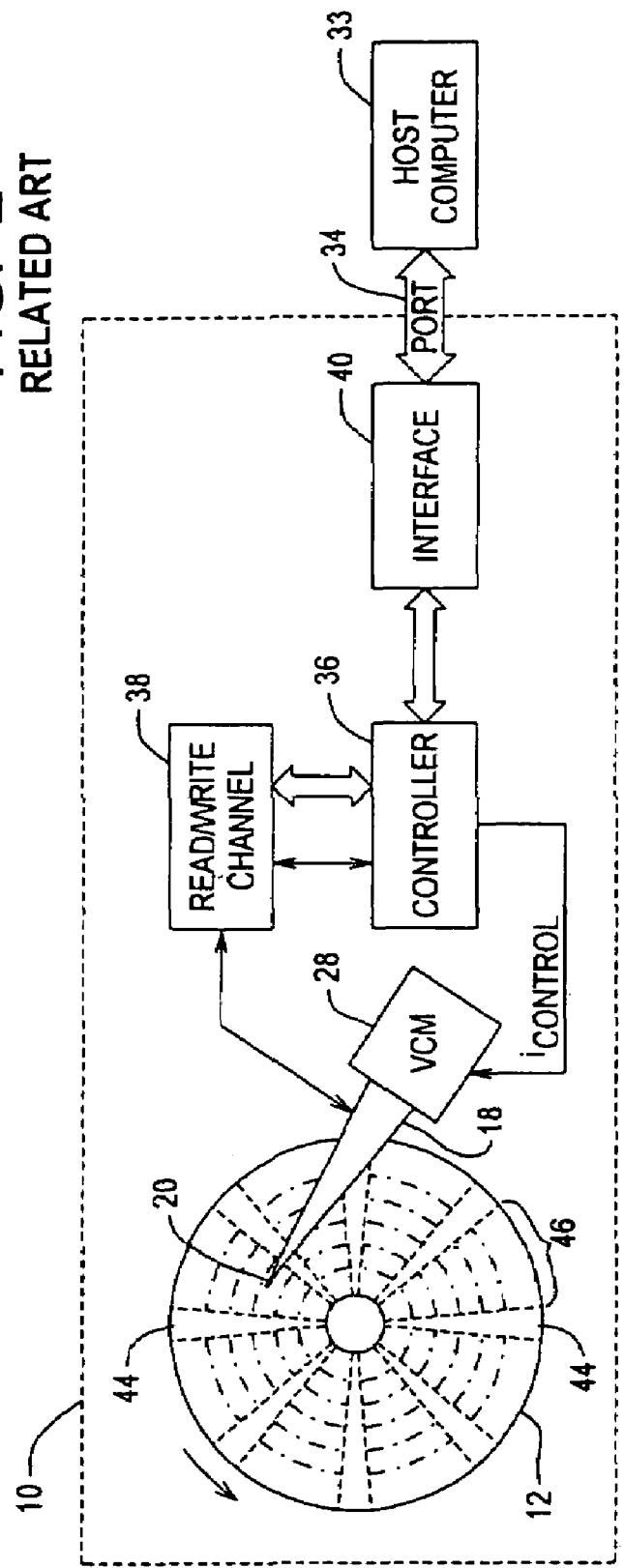
FIG. 2 is a functional block diagram of a conventional disk drive coupled to a host computer.
Figure 3:
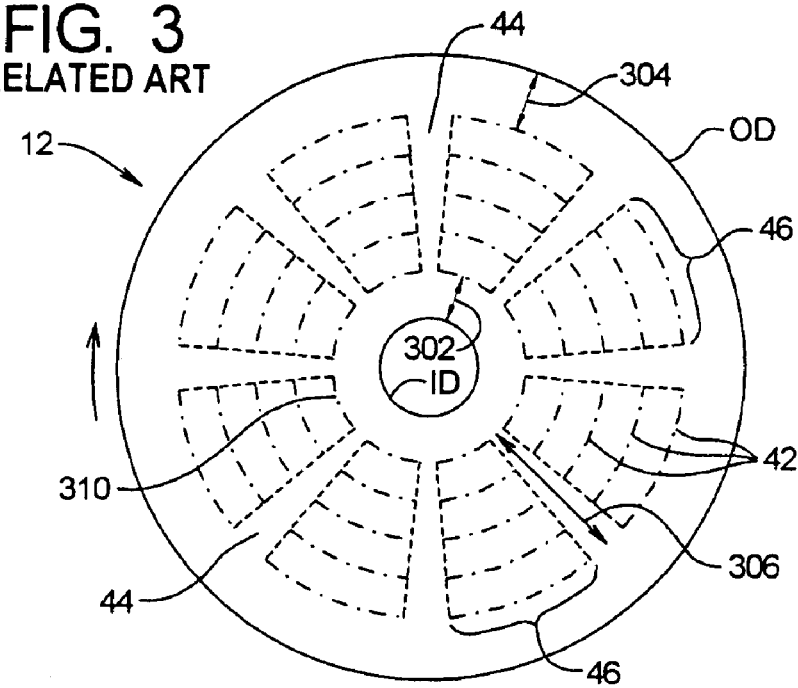
FIG. 3 is a diagrammatic representation of a top view of a conventional magnetic storage disk illustrating a typical organization of customer data, keep-out regions near the inner and outer diameters of the disk, a certified region between the keep-out regions and a utility zone in the certified region.
Figure 4:
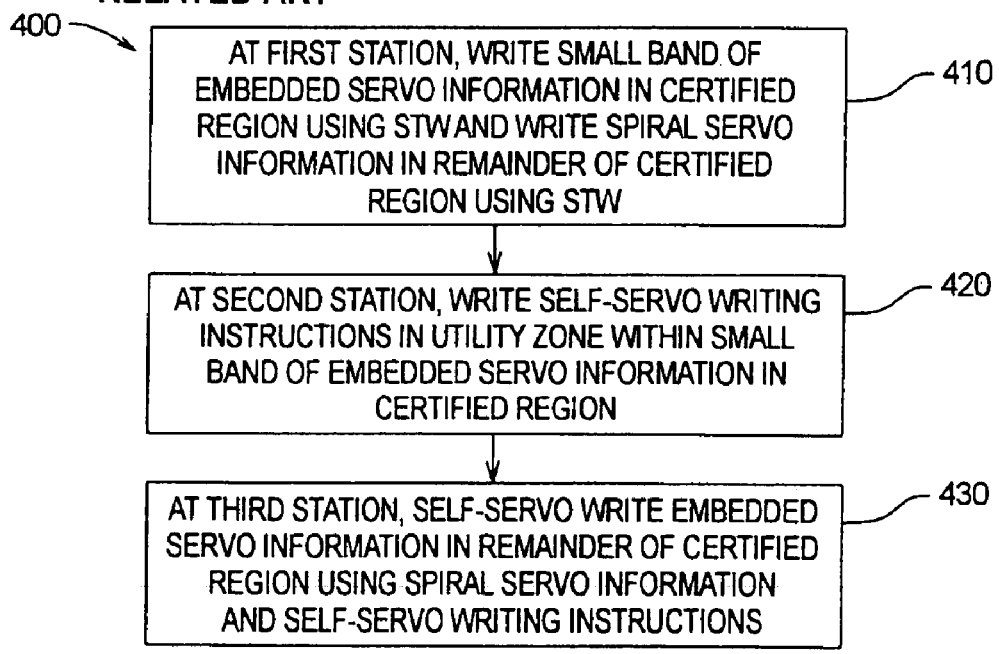
FIG. 4 is a flowchart illustrating self-servo writing that creates a discontinuity between the final servo information and the utility zone.

While embodiments of the present invention are susceptible of many different forms, there are shown in the drawings and will herein be described in detail, preferred embodiments of the invention with the understanding that the present disclosure is to be considered as an exemplification of the principles of the embodiments and is not intended to limit the broad aspects of the embodiments to those illustrated.

Figure 6:
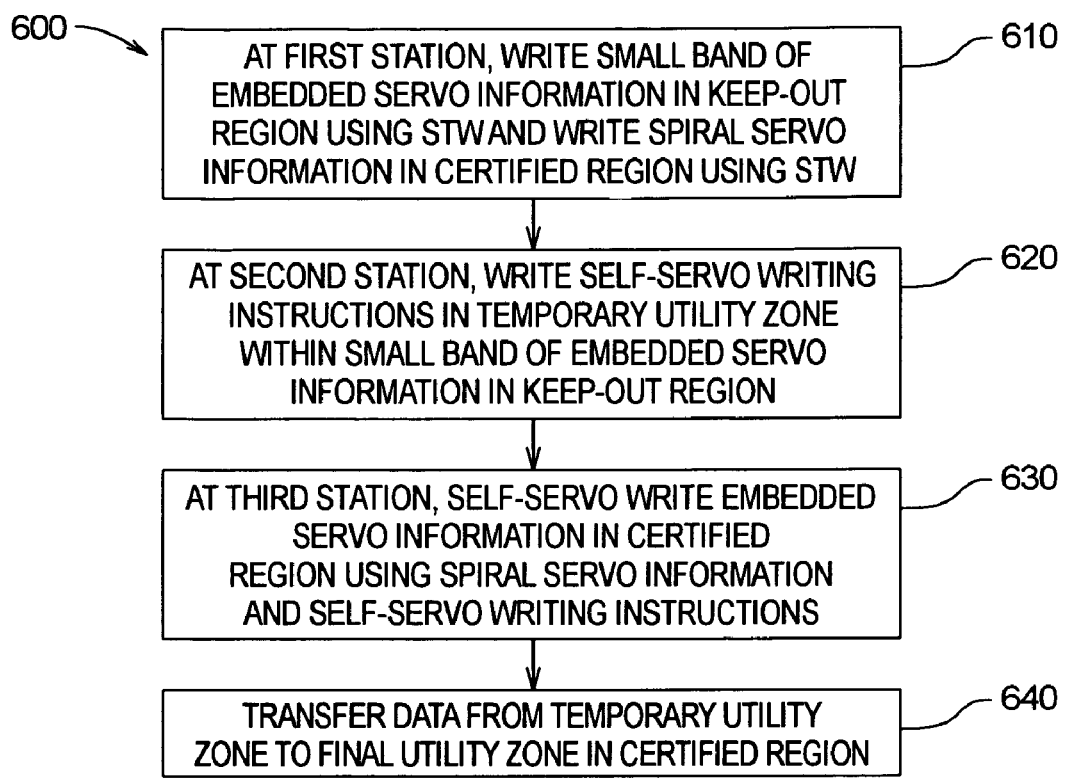
FIG. 6 is a flowchart illustrating self-servo writing that avoids a discontinuity between the final servo information and the utility zone.

FIG. 5A diagrammatically depicts, and FIG. 6 is a flowchart 600 illustrating, self-servo writing that avoids a discontinuity between the final servo information and the utility zone.

The disk drive is placed in a first station that includes a STW (step 610). The STW is used to write a small band of final embedded servo information in a circumferential fashion in the keep-out region of the disk. The STW is also used to write temporary spiral servo information, adjacent to the small band of embedded servo information, across the certified region. Thus, instead of using the STW to write the embedded servo information in the certified region, the STW is used to write the embedded servo information in the keep-out region and write the spiral servo information across the entire certified region. However, the STW is not used to write embedded servo information in the certified region or spiral servo information in the keep-out region.

Next, the disk drive is moved to a second station, so as to free-up the STW at the first station for other disk drives (step 620). At the second station, which includes a host connection to the disk drive, self-servo writing instructions are written in a temporary utility zone that is within the small band of embedded servo information in the keep-out region. Diagnostic information and self-test code may also be written in the temporary utility zone.

Next, the disk drive is moved to a third station (step 630). The disk drive is powered-on, reads the self-servo writing instructions in the temporary utility zone, and converts the spiral servo information into embedded servo information without further assistance from the STW. More specifically, the disk drive positions the transducer by servoing on the spiral servo information to self-servo write embedded servo information in the certified region using the self-servo write instructions. However, the self-servo writing does not write servo information in the keep-out region.

Thereafter, data is transferred from the temporary utility zone to a final utility zone in the certified region (step 640). The temporary utility zone includes self-servo writing instructions that are unnecessary for normal operation of the disk drive. Therefore, the self-servo writing instructions are not transferred to the final utility zone. However, the temporary utility zone includes other data, such as bad sector data or other defect information, that is used during normal operation of the disk drive and therefore is transferred to the final utility zone. As shown in FIG. 5B, since the final utility zone receives some but not all data in the temporary utility zone, the final utility zone can be smaller than the temporary utility zone, thereby increasing the storage capacity for customer data.

Advantageously, although data in the keep-out region might be inaccessible during normal operation of the disk drive due to disk slip, data in the keep-out region can be reliably accessed during manufacturing since it is highly unlikely that the disk drive will experience a large disk slip at this early stage.

Furthermore, although a discontinuity occurs between the temporary utility zone and the certified region, and the transducer crosses the discontinuity during the data transfer from the temporary utility zone to the final utility zone, the disk drive is not subject to stringent performance requirements during manufacturing and therefore the data can be transferred across the discontinuity at a relatively cautious pace. Even further, the data transfer from the temporary utility zone to the final utility zone may only require one or, at most, a few crosses of the discontinuity.

Moreover, since the temporary utility zone need not be accessed during normal operation of the disk drive, the discontinuity between the temporary utility zone and the certified region need not be crossed during normal operation of the disk drive.

The disk drive can initially write data in the temporary utility zone (before the self-servo writing) and later write data in the final utility zone (after the self-servo writing) by re-writing the drive code. However, rather than re-writing the drive code, the preferred approach is injecting a track offset so that the disk drive is "fooled" into believing that it is writing data in the final utility zone in the certified region when, in fact, it is writing data in the temporary utility zone in the keep-out region.

Figure 7:
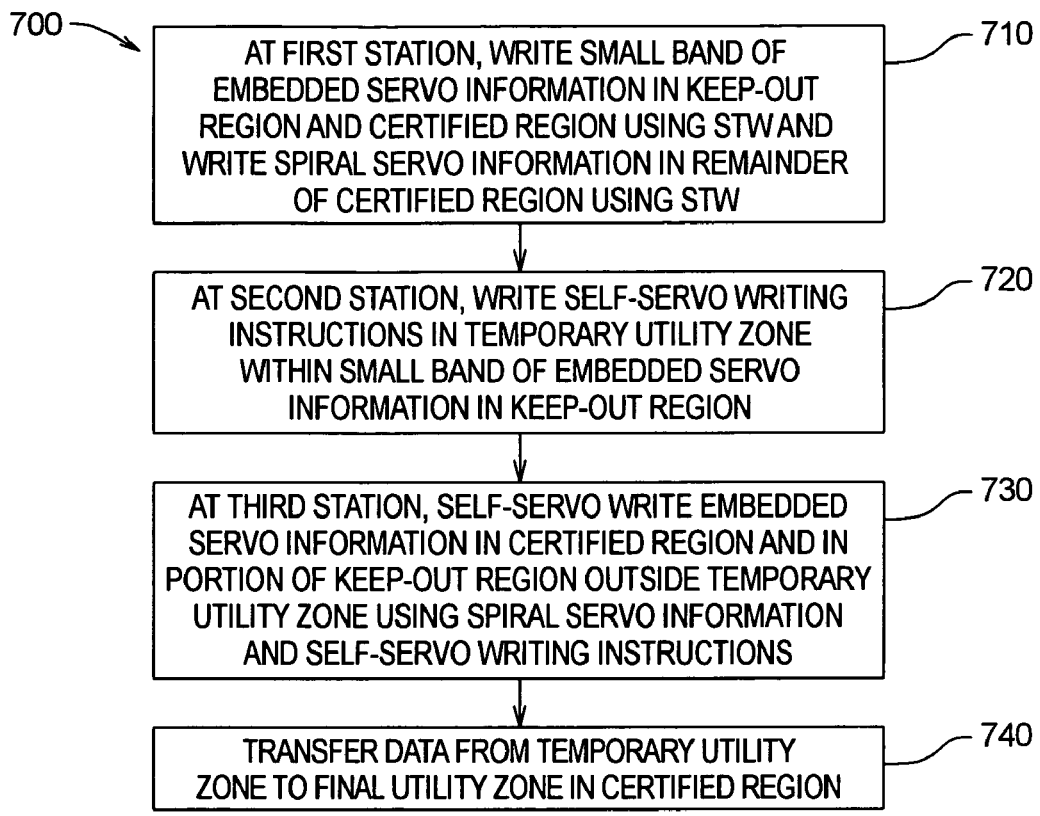
FIG. 7 is a flowchart illustrating self-servo writing that avoids a discontinuity between the final servo information and the utility zone.

FIG. 7 is a flowchart 700 illustrating self-servo writing that avoids a discontinuity between the final servo information and the utility zone.

The disk drive is placed in a first station that includes a STW (step 710). The STW is used to write a small band of final embedded servo information in both the keep-out region and the certified region. The STW is also used to write temporary spiral servo information, adjacent to the small band of embedded servo information, across the remainder of the certified region. However, the STW does not write spiral servo information in the keep-out region.

Next, the disk drive is moved to a second station, so as to free-up the STW at the first station for other disk drives (step 720). At the second station, which includes a host connection to the disk drive, self-servo writing instructions are written in a temporary utility zone that is within the small band of embedded servo information in the keep-out region. Diagnostic information and self-test code may also be written in the temporary utility zone.

Next, the disk drive is moved to a third station (step 730). The disk drive is powered-on, reads the self-servo writing instructions in the temporary utility zone, and converts the spiral servo information into embedded servo information without further assistance from the STW. More specifically, the disk drive positions the transducer by servoing on the spiral servo information to self-servo write embedded servo information in the certified region using the self-servo writing instructions. The self-servo writing also overwrites the embedded servo information in the certified region that was written using the STW with embedded servo information, which causes the discontinuity to move towards the keep-out region, and overwrites a portion of the embedded servo information in the keep-out region that was written using the STW with embedded servo information, which causes the discontinuity to move into the keep-out region. However, the self-servo writing does not write servo information in the temporary utility zone, and thus does not overwrite the temporary utility zone.

Thereafter, data is transferred from the temporary utility zone to a final utility zone in the certified region (step 740).

Figure 8:
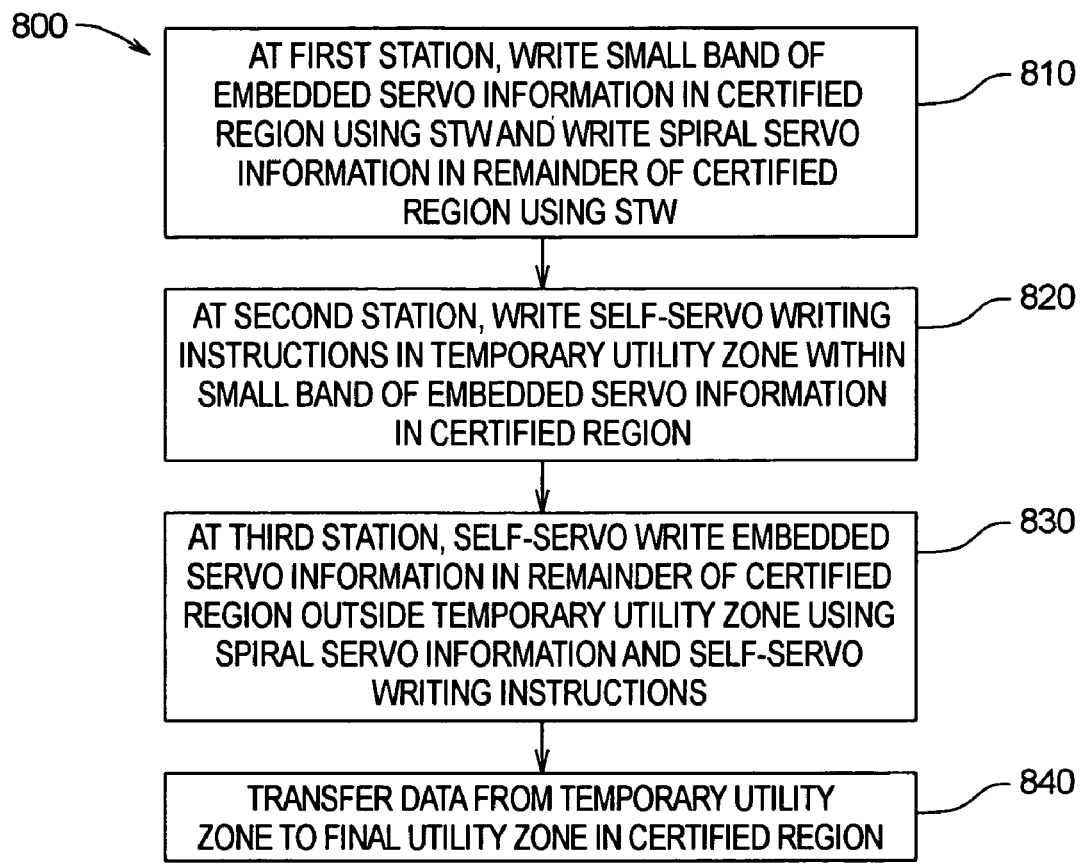
FIG. 8 is a flowchart illustrating self-servo writing that avoids a discontinuity between the final servo information and the utility zone.

FIG. 8 is a flowchart 800 illustrating self-servo writing that avoids a discontinuity between the final servo information and the utility zone.

The disk drive is placed in a first station that includes a STW (step 810). The STW is used to write a small band of final embedded servo information in the certified region. The STW is also used to write temporary spiral servo information, adjacent to the small band of embedded servo information, across the remainder of the certified region. However, the STW does not write servo information in the keep-out region.

Next, the disk drive is moved to a second station, so as to free-up the STW at the first station for other disk drives (step 820). At the second station, which includes a host connection to the disk drive, self-servo writing instructions are written in a temporary utility zone that is within the small band of embedded servo information in the certified region. Diagnostic information and self-test code may also be written in the temporary utility zone.

Next, the disk drive is moved to a third station (step 830). The disk drive is powered-on, reads the self-servo writing instructions in the temporary utility zone, and converts the spiral servo information into embedded servo information without further assistance from the STW. More specifically, the disk drive positions the transducer by servoing on the spiral servo information to self-servo write embedded servo information in the remainder of the certified region using the self-servo writing instructions. However, the self-servo writing does not write servo information in the temporary utility zone, and does not write servo information in the keep-out region.

Thereafter, data is transferred from the temporary utility zone to a final utility zone in the certified region (step 840).

The flowchart 800 embodiment is considered less favorable than the flowchart 600 embodiment because the portion of the certified region occupied by the temporary utility zone is not used during normal operation of the disk drive, thereby decreasing the storage capacity for customer data. Nevertheless, the unused portion of the certified region may amount to only 1% of the disk surface. Furthermore, self-servo writing over a portion of the small band of embedded servo information (but not the temporary utility zone) causes the discontinuity to move towards the keep-out region.

The present embodiments can be used with a wide variety of self-servo writing techniques (and servo writing techniques) and is not limited to the self-servo writing described herein. Likewise, the present embodiments can be used whenever a discontinuity exists between servo information written on a disk. Furthermore, the embodiments described above may be combined with one another.

The temporary utility zone can be located in a keep-out region at the ID, the OD or elsewhere on the disk. Preferably, the final utility zone is adjacent to the discontinuity. However, the final utility zone can be located anywhere in the certified region. Furthermore, the final utility zone can be composed of multiple tracks, a single track or even one or more data sectors in a track.

The servo writing using the STW, writing data in the temporary utility zone, and self-servo-writing can be performed at three stations, or two stations, or a single station.

The servo writing using the STW, writing data in the temporary utility zone, self-servo-writing and transferring data from the temporary utility zone to the final utility zone can be performed during manufacturing of the disk drive, then the disk drive can be delivered to a customer, and then customer data can be written to and read from the certified region but not the keep-out region during normal operation of the disk drive.

While an effort has been made to describe some alternatives to the preferred embodiments, other alternatives will readily come to mind to those skilled in the art. Therefore, it should be understood that the embodiments of the present invention may be embodied in other specific forms without departing from the spirit or central characteristics thereof. The present examples and embodiments, therefore, are to be considered in all respects as illustrative and not restrictive, and the present embodiments are not intended to be limited to the details given herein.

What is claimed is:

1. A method comprising:
providing a disk surface and a transducer that writes to the disk surface, wherein the disk surface includes a keep-out region and a certified region, the keep-out region is prohibited from storing customer data and the certified region is for storing customer data; and
writing a temporary utility zone in the keep-out region.

2. The method of claim 1 further including performing a self-servo write operation to write servo information in the certified region using data from the temporary utility zone.

3. The method of claim 2 further including writing data associated with the self-servo write operation in the temporary utility zone.

4. The method of claim 3 wherein the data associated with the self-servo write operation includes bad sector data.

5. The method of claim 4 further including transferring the bad sector data from the temporary utility zone to a final utility zone in the certified region.

6. The method of claim 1 further including transferring data from the temporary utility zone to a final utility zone in the certified region.

7. The method of claim 6 wherein less than all of the data in the temporary utility zone is transferred to the final utility zone.

8. The method of claim 6 wherein the temporary utility zone includes tracks written according to a first servo writing operation and the final utility zone includes tracks written according to a second servo writing operation different from the first servo writing operation.

9. the method of claim 8 wherein a discontinuity exists between the temporary utility zone and the final utility zone.

10. A method comprising:
providing a disk surface and a transducer that writes to the disk surface, wherein the disk surface has a discontinuity that defines a first region and a second region on the disk surface;
writing a temporary utility zone in the first region;

performing a self-servo write operation to write servo information in the second region using data from the temporary utility zone;

writing data associated with the self-servo write operation in the temporary utility zone; and transferring data from the temporary utility zone to a final utility zone in the second region.

11. The method of claim 10 wherein the writing data step is characterized by writing bad sector data to the temporary utility zone.

12. The method of claim 11 wherein the data transferred from the temporary utility zone to the final utility zone includes the bad sector data.

13. The method of claim 12 wherein less than all of the data in the temporary utility zone is transferred to the final utility zone.

14. The method of claim 10 wherein the first region is written using a servo track writer.

15. The method of claim 10 wherein the discontinuity extends substantially about a radius of the disk surface.

16. An apparatus comprising:

a disk surface and a transducer that writes to the disk surface, wherein the disk surface includes a keep-out region and a certified region, the keep-out region is prohibited from storing customer data and the certified region is for storing customer data; and a temporary utility zone written in the keep-out region.

17. The apparatus of claim 16 further including servo information that has been self-servo written in the certified region using data from the temporary utility zone.

18. The apparatus of claim 17 wherein data associated with the self-servo write operation is written in the temporary utility zone.

19. The apparatus of claim 18 wherein the data associated with the self servo write operation includes bad sector data.

20. The apparatus of claim 19 wherein the bad sector data is transferred from the temporary utility zone to a final utility zone in the certified region.

21. The apparatus of claim 16 wherein data is transferred from the temporary utility zone to a final utility zone in the certified region.

22. The apparatus of claim 21 wherein less than all of the data in the temporary utility zone is transferred to the final utility zone.

23. The apparatus of claim 21 wherein the temporary utility zone includes tracks written according to a first servo writing operation and the final utility zone includes tracks written according to a second servo writing operation different from the first servo writing operation.

24. The apparatus of claim 23 further including a discontinuity between the temporary utility zone and the final utility zone.

25. An apparatus comprising:

a disk surface and a transducer that writes to the disk surface, wherein the disk surface has a discontinuity that defines a first region and a second region on the disk surface;

a temporary utility zone written in the first region, wherein a self-servo write operation writes servo information in the second region using the transducer and using data from the temporary utility zone, and wherein data associated with the self-servo write operation is written in the temporary utility zone; and transferring data from the temporary utility zone to a final utility zone in the second region.

26. The apparatus of claim 25 wherein the data written to the temporary utility zone comprises bad sector data.

27. The apparatus of claim 26 wherein the data transferred from the temporary utility zone to the final utility zone includes the bad sector data.

28. The apparatus of claim 27 wherein less than all of the data in the temporary utility zone is transferred to the final utility zone.

29. The apparatus of claim 25 wherein the first region is written using a servo track writer.

30. The apparatus of claim 25 wherein the discontinuity extends substantially about a radius of the disk surface.

31. In a disk drive that includes a disk and a transducer that reads from and writes to the disk, wherein the disk includes a keep-out region and a certified region, the keep-out region is reserved for disk slip and is prohibited from storing customer data, and the certified region is not reserved for disk slip and is designated for storing customer data, a method of operating the disk drive, comprising:

writing data in a temporary utility zone in the keep-out region using the transducer;

reading the data from the temporary utility zone using the transducer, and self-servo writing final servo information in the certified region using the transducer and the data read from the temporary utility zone.

32. The method of claim 31, wherein the keep-out zone is located at an inner diameter of the disk and between the certified region and the inner diameter.

33. The method of claim 31, wherein the keep-out zone is located at an outer diameter of the disk and between the certified region and the outer diameter.

34. The method of claim 31, wherein the data includes self-servo writing instructions.

35. The method of claim 31, wherein the data includes diagnostic information.

36. The method of claim 31, including writing final servo information in the keep-out region using the transducer, and then writing the data in the temporary utility zone using the final servo information in the keep-out region to position the transducer.

37. The method of claim 36, wherein the final servo information in the keep-out region is radially incoherent with the final servo information in the certified region, thereby creating a discontinuity on the disk.

38. The method of claim 37, wherein the discontinuity is due to writing the final servo information in the keep-out region and the final servo information in the certified region under different environmental conditions.

39. The method of claim 37, wherein the discontinuity extends substantially about a radius of the disk.

40. The method of claim 36, excluding writing final servo information in the certified region before writing the data in the temporary utility zone.

41. The method of claim 31, including writing temporary servo information in the certified region using the transducer and a servo track writer that is external to the disk drive to position the transducer.

42. The method of claim 41, wherein the temporary servo information is arranged as spirals.

43. The method of claim 41, including self-servo writing the final servo information in the certified region using the temporary servo information to position the transducer.

44. The method of claim 41, including writing final servo information in the keep-out region using the transducer and the servo track writer to position the transducer.

45. The method of claim 41, excluding writing temporary servo information in the keep-out region.

46. The method of claim 41, including writing final servo information in the keep-out region using the transducer and a servo track writer that is external to the disk drive to position the transducer.

47. The method of claim 46, including writing the data in the temporary utility zone using the final servo information in the keep-out region to position the transducer, and reading the data from the temporary utility zone using the final servo information in the keep-out region to position the transducer.

48. The method of claim 47, wherein the data includes self-servo writing instructions.

49. The method of claim 47, wherein the data includes diagnostic information.

50. The method of claim 46, excluding writing final servo information in the certified region using the servo track writer.

51. The method of claim 31, including:
writing temporary servo information in the certified region using the transducer and a servo track writer that is external to the disk drive to position the transducer;
writing final servo information in the keep-out region using the transducer and the servo track writer to position the transducer;
writing the data in the temporary utility zone using the final servo information in the keep-out region to position the transducer;
reading the data from the temporary utility zone using the final servo information in the keep-out region to position the transducer; and
self-servo writing the final servo information in the certified region using the temporary servo information to position the transducer.

52. The method of claim 51, wherein the temporary servo information is arranged as spirals.

53. The method of claim 51, wherein the data includes self-servo writing instructions.

54. The method of claim 51, wherein the data includes diagnostic information.

55. The method of claim 51, including writing final servo information in the certified region using the transducer and the servo track writer to position the transducer.

56. The method of claim 55, including self-servo writing the final servo information in the certified region to overwrite the final servo information written in the certified region using the servo track writer.

57. The method of claim 51, including:
writing the temporary servo information and the final servo information using the servo track writer while the disk drive is located at a first station; and then
writing the data and self-servo writing the final servo information while the disk drive is located at a second station.

58. The method of claim 51, including:
writing the temporary servo information and the final servo information using the servo track writer while the disk drive is located at a first station; then
writing the data while the disk drive is located at a second station; and then
self-servo writing the final servo information while the disk is located at a third station.

59. The method of claim 51, excluding writing temporary servo information in the keep-out region.

60. The method of claim 51, excluding writing final servo information in the certified region using the servo track writer.

61. The method of claim 31, including transferring data from the temporary utility zone to a final utility zone in the certified region after self-servo writing the final servo information in the certified region.

62. The method of claim 61, wherein the transferred data includes bad sector data.

63. The method of claim 61, wherein the transferred data excludes other data in the temporary utility zone.

64. The method of claim 63, wherein the temporary utility zone is larger than the final utility zone.

65. The method of claim 61, including transferring the data during manufacture of the disk drive, and then delivering the disk drive to a customer.

66. The method of claim 31, including writing final servo information in the keep-out region using a servo track writer that is external to the disk drive, and excluding self-servo writing final servo information in the keep-out region.

67. The method of claim 31, including bumping the disk drive to cause disk slip, thereby rendering data inaccessible in the keep-out region without rendering data inaccessible in the certified region.

68. The method of claim 31, including transferring customer data between the disk drive and a host computer during read and write operations.

69. The method of claim 31, including performing the self-servo-writing during manufacture of the disk drive, then delivering the disk drive to a customer, and then writing customer data in the certified region and excluding writing customer data in the keep-out region.

70. The method of claim 31, including performing the self-servo-writing during manufacture of the disk drive, then delivering the disk drive to a customer, and then writing customer data in the certified region and excluding writing customer data in the keep-out region.

71. In a disk drive that includes a disk and a transducer that reads from and writes to the disk, wherein the disk includes a keep-out region and a certified region, the keep-out region is reserved for disk slip and is prohibited from storing customer data, and the certified region is not reserved for disk slip and is designated for storing customer data, a method of operating the disk drive, comprising the following steps in the sequence set forth:
writing final servo information in the keep-out region and temporary servo information in the certified region using the transducer and a servo track writer that is external to the disk drive to position the transducer;
writing self-servo writing instructions in a temporary utility zone in the keep-out region using the transducer and the final servo information in the keep-out region to position the transducer;
reading the self-servo writing instructions from the temporary utility zone using the transducer and the final servo information in the keep-out region to position the transducer;
self-servo writing final servo information in the certified region using the transducer, the temporary servo information to position the transducer and the self-servo writing instructions read from the temporary utility zone; and
transferring data in the temporary utility zone to a final utility zone in the certified region using the transducer and the final servo information in the keep-out region and the certified region to position the transducer.

72. The method of claim 71, wherein the keep-out zone is located at an inner diameter of the disk and between the certified region and the inner diameter.

73. The method of claim 71, wherein the keep-out zone is located at an outer diameter of the disk and between the certified region and the outer diameter.

74. The method of claim 71, wherein the final servo information in the keep-out region is radially incoherent with the final servo information in the certified region, thereby creating a discontinuity on the disk that extends substantially about a radius of the disk.

75. The method of claim 71, wherein the temporary servo information is arranged as spirals.

76. The method of claim 71, wherein the transferred data includes bad sector data.

77. The method of claim 71, including bumping the disk drive to cause disk slip, thereby rendering data inaccessible in the keep-out region without rendering data inaccessible in the certified region.

78. The method of claim 71, excluding writing customer data in the keep-out region.

79. The method of claim 71, excluding writing temporary servo information in the keep-out region.

80. The method of claim 71, excluding writing final servo information in the certified region using the servo track writer.

81. In a disk drive that includes a disk and a transducer that reads from and writes to the disk, wherein the disk includes a keep-out region and a certified region, the keep-out region is reserved for disk slip and is prohibited from storing customer data, and the certified region is not reserved for disk slip and is designated for storing customer data, a method of operating the disk drive, comprising the following steps in the sequence set forth:

writing final servo information in the keep-out region and temporary servo information in the certified region using the transducer and a servo track writer that is external to the disk drive to position the transducer;

writing self-servo writing instructions in a temporary utility zone in the keep-out region using the transducer and the final servo information in the keep-out region to position the transducer;

reading the self-servo writing instructions from the temporary utility zone using the transducer and the final servo information in the keep-out region to position the transducer;

self-servo writing final servo information in the certified region using the transducer, the temporary servo information to position the transducer and the self-servo writing instructions read from the temporary utility zone;

transferring data in the temporary utility zone to a final utility zone in the certified region using the transducer and the final servo information in the keep-out region and the certified region to position the transducer;

delivering the disk drive to a customer;

writing customer data in the certified region using the transducer and the final servo information in the certified region to position the transducer;

reading customer data from the certified region using the transducer and the final servo information in the certified region to position the transducer; and prohibiting writing customer data in the keep-out region.

82. The method of claim 81, wherein the keep-out zone is located at an inner diameter of the disk and between the certified region and the inner diameter.

83. The method of claim 81, wherein the keep-out zone is located at an outer diameter of the disk and between the certified region and the outer diameter.

84. The method of claim 81, wherein the final servo information in the keep-out region is radially incoherent with the final servo information in the certified region, thereby creating a discontinuity on the disk that extends substantially about a radius of the disk.

85. The method of claim 81, wherein the temporary servo information is arranged as spirals.

86. The method of claim 81, wherein the transferred data includes bad sector data.

87. The method of claim 81, including bumping the disk drive to cause disk slip, thereby rendering data inaccessible in the keep-out region without rendering data inaccessible in the certified region.

88. The method of claim 81, excluding reading customer data from the keep-out region.

89. The method of claim 81, excluding writing temporary servo information in the keep-out region.

90. The method of claim 81, excluding writing final servo information in the certified region using the servo track writer.

* * * * *